July 31, 1945.                J. D. HENDRICKSON                2,380,755
                              ROTARY FISH SKINNER
                              Filed Oct. 5, 1943              2 Sheets-Sheet 1

Inventor
J. D. Hendrickson
By Mason Fenwick & Lawrence
Attorneys

July 31, 1945.  J. D. HENDRICKSON  2,380,755
ROTARY FISH SKINNER
Filed Oct. 5, 1943   2 Sheets-Sheet 2

Inventor
J. D. Hendrickson
By Mason, Fenwick & Lawrence
Attorneys

Patented July 31, 1945

2,380,755

UNITED STATES PATENT OFFICE 2,380,755

ROTARY FISH SKINNER

Jay Donald Hendrickson, Astoria, Oreg., assignor to Columbia River Packers Association, Inc., Astoria, Oreg.

Application October 5, 1943, Serial No. 505,047

2 Claims. (Cl. 17—2)

This invention relates to a method and apparatus for skinning fish and in particular to skinning fillet of fish.

The wet, slippery surface of fish skin offers serious problems in connection with holding the pieces to be skinned during the skinning operation and various expedients have been resorted to, such as pressure or even the use of vacuum, but so far as is known, such expedients have proven unsatisfactory and wasteful in that the fillet is not held with sufficient rigidity and with the skin pressed to proper smoothness to permit the severing of the skin with the minimum of clearance and resulting waste of the flesh.

In accordance with the present invention, it is proposed to press the wet fillet of fish with the skin surface directed toward a smooth supporting surface reduced in temperature below the freezing point of the water or other wetting medium, thus causing the fillet to become temporarily frozen to that surface, with the skin adhering uniformly and at all points thereover, so that the severing knife can be passed through the fillet very close to the skin and thus remove the skin with a minimum loss of flesh.

A further object of the invention is to provide suitable apparatus by means of which this process can be efficiently performed.

The invention consists in the novel method and combinations, arrangement and construction of parts hereinafter more specifically described and claimed.

Two sheets of drawings accompany this specification as part thereof, in which like reference characters indicate like parts throughout, in which Figure 1 is a side elevation, largely diagrammatic, of an apparatus embodying the present invention.

Figure 5 is a fragmentary transverse cross-section taken through the freezing drum and showing the relative locations of the skinning knife and scraper with respect to the drum surface.

Figure 1:
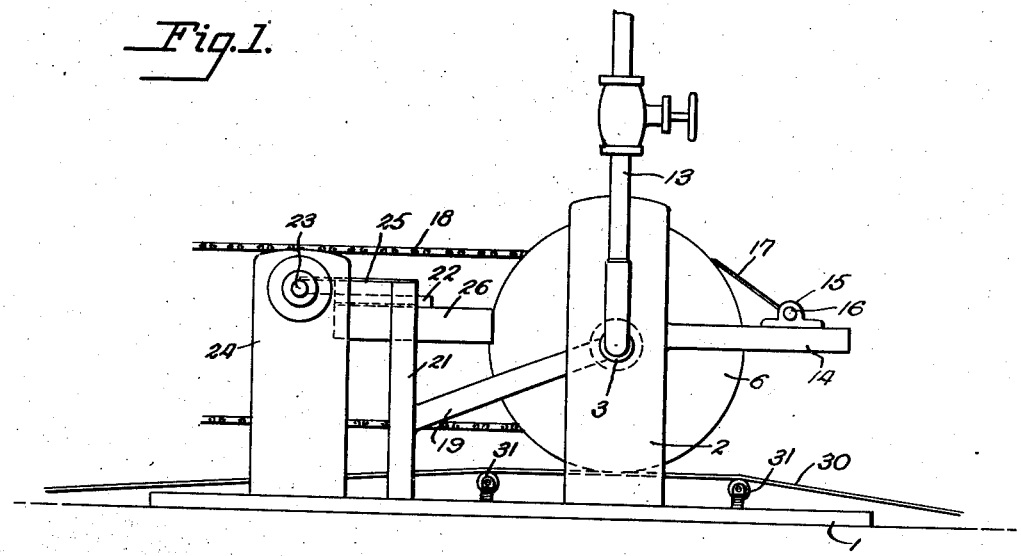
Figure 2:
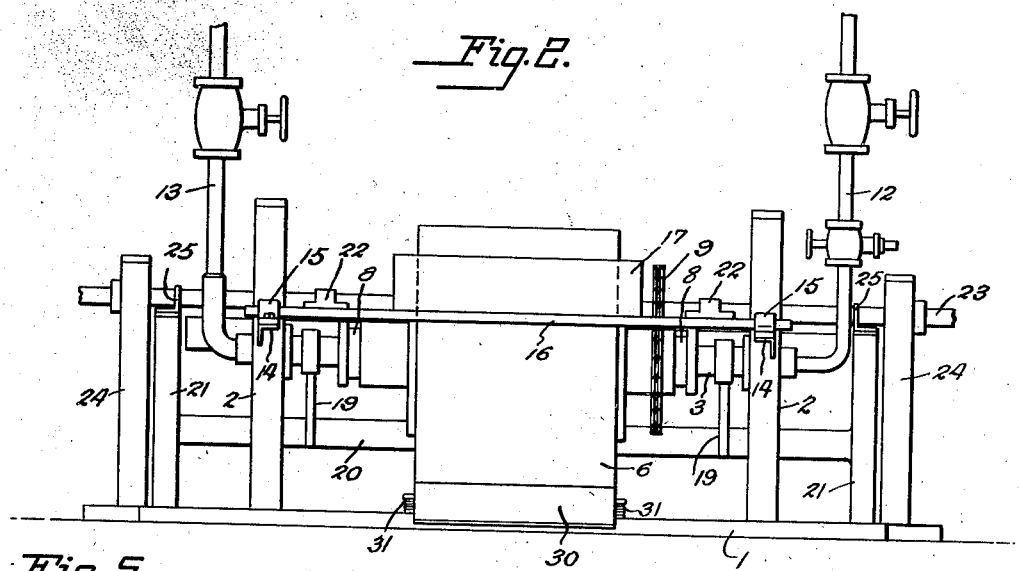
Figure 2 is an end view of the apparatus illustrated in Figure 1.
Figure 3:
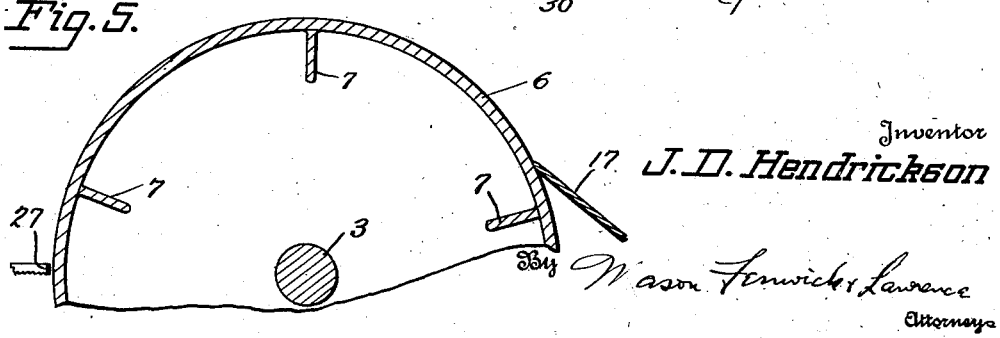
Figure 3 is a plan view of the apparatus shown in Figure 1.
Figure 3:
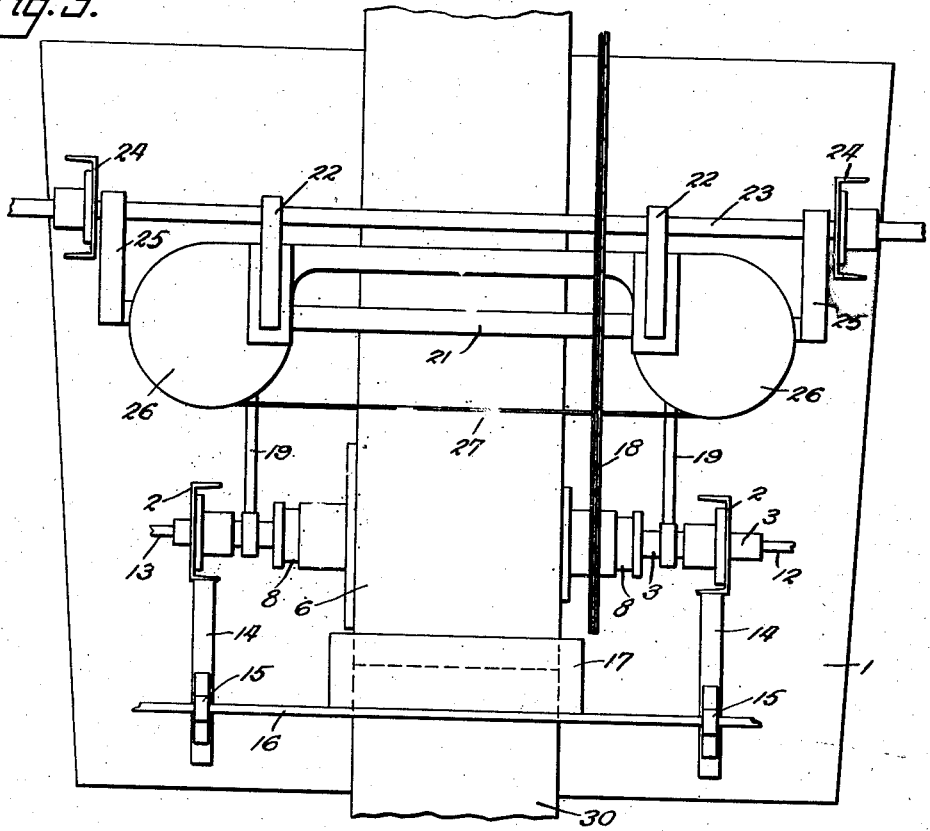
Figure 4:
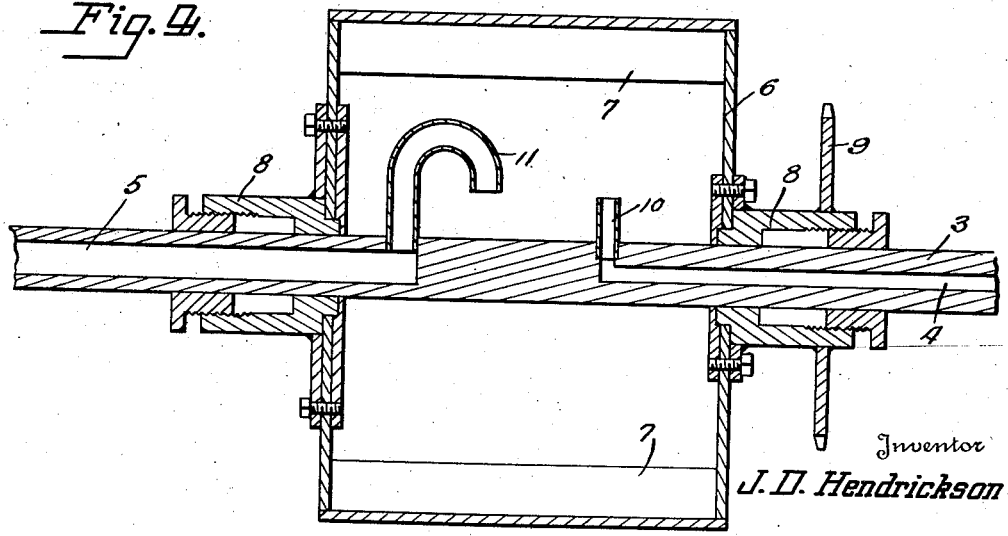
Figure 4 is a vertical longitudinal cross-section taken through the freezing drum and its supporting shaft.

The form of the invention illustrated in the accompanying drawings shows a base 1 upon which are spaced vertical supports 2 carrying a fixed transverse shaft 3 which is provided at one end with an axial inlet bore 4 and at the other end with an axial outlet bore 5, which bores have their inner ends spaced apart and communicating with radial bores, the inlet bore 4 communicating with a nipple 10 and the outlet bore 5 communicating with a goose neck 11. Rotatably mounted on the shaft 3 is a cylindrical drum 6, the ends of which are provided with suitable packing bearings 8 which permit the free rotation of the drum 6 upon the shaft 3 but prevent the escape of a refrigerant which is introduced from a source (not shown) through a suitably valved pipe 12 connecting with shaft 3 and bore 4 and removed from the drum through the goose neck 11, bore 5 and an outlet pipe 13. The drum 6 is preferably provided with inwardly directed radial flanges 7 adapted to agitate the refrigerant within the drum so as to provide a substantially uniform temperature for the cylindrical surface of the drum. On one of the journals 8 is secured a sprocket 9 which is connected by a suitable chain 18 to a source of power not shown.

Extending rearwardly from the vertical supports 2 are horizontal arms 14 carrying journals 15 for a transverse shaft 16, upon which is mounted a scraper blade 17 adapted to contact the surface of the drum 6.

Additional vertical supports 21 and 24 are also carried by the base 1, the vertical supports 21 being connected by diagonal frame members 19 with the shaft 3 and being also connected by the horizontal frame members 25 with a transverse shaft 23 extending through and supported by the vertical supports 24—24. Additional frame members 22—22 are carried by the transverse shaft 23 and the horizontal frame members 22 and 25 support the housing 26 of an endless band saw 27, the exposed edge of which is positioned adjacent, spaced from, and substantially on the horizontal diameter of the cylindrical surface of the drum 6.

An endless conveyor belt 30 passes over the base 1 and under the cylinder 6, being supported resiliently against the surface of cylinder 6 by means of spring supported rollers 31 positioned on either side of cylinder 6 so that the portion of belt 30 below cylinder 6 is pressed upwardly against the bottom surface of the drum.

In operation, a suitable refrigerant will be admitted through pipe 12 and bore 4 of shaft 3 into the interior of cylinder 6 and the refrigerant will pass from the interior of cylinder 6 through bore 5 of shaft 3 and pipe 13. The gas will be thoroughly agitated within the cylinder and will operate to refrigerate or reduce the temperature of the cylindrical surface below the freezing point of water to such temperature as is found most effective in operation.

The fish fillets will be placed upon the conveyor belt 30, skin surface up, and advanced under the cylinder 6, being pressed against its surface by means of the pressure exerted upon belt 30 by the spring supported rollers 31—31, so that the fillets will be frozen with their skins in close contact throughout with the surface of cylinder 6. The rotation of cylinder 6 upon shaft 3 will carry the fillets thus frozen upon its surface upwardly and past the rotating band saw 27 which will sever the skins from the flesh of the fillets evenly and with the minimum clearance from the skin, permitting the fleshy part of the fillets to drop back upon conveyor belt 30 and thence out of the device. Further rotation of the drum 6 will carry the remaining skin portions of the fillet still frozen to the drum to scraper blade 17 which will remove such skins from its surface, thus clearing the surface for further engagement with additional fillets upon belt 30.

Various modifications will readily suggest themselves to those skilled in the art in connection with the apparatus herein illustrated and other mechanical means may doubtless be employed in carrying out the method, but all within the scope of the present invention as claimed.

Having thus fully described my invention, I claim:

1. Fish skinner device comprising in combination a rotary drum of thermal conducting material having a smooth cylindrical surface, means for circulating a refrigerant through said drum, a conveyor belt passing tangentially to the drum, arranged to press fillets thereon skin up against the drum surface, a knife having its cutting edge extending transversely of the drum and spaced in parallel relationship to the cylindrical surface and a scraper contacting this cylindrical surface back of the knife with respect to the direction of rotation of the drum.

2. Fish skinner device comprising in combination a rotary drum of thermal conducting material having a smooth cylindrical surface, means for circulating a refrigerant through said drum, a conveyor belt passing under the drum in the direction of its rotation, means for resiliently pressing the belt toward the adjacent drum surface, a knife having its cutting edge extending transversely of the drum and spaced in parallel relationship to the cylindrical surface and a scraper contacting the cylindrical surface back of the knife edge with respect to the direction of rotation of the drum.

JAY DONALD HENDRICKSON.